(12) United States Patent
Shelton

(10) Patent No.: US 6,550,189 B2
(45) Date of Patent: *Apr. 22, 2003

(54) WEATHER SHELTER

(76) Inventor: Andrew B. Shelton, 262 Fayetteville Rd., Fairburn, GA (US) 30213

( * ) Notice: Subject to any disclaimer, the term of this patent is extended or adjusted under 35 U.S.C. 154(b) by 0 days.

This patent is subject to a terminal disclaimer.

(21) Appl. No.: 10/205,694

(22) Filed: Jul. 26, 2002

(65) Prior Publication Data

US 2002/0184837 A1 Dec. 12, 2002

Related U.S. Application Data

(63) Continuation of application No. 09/834,018, filed on Apr. 12, 2001, now Pat. No. 6,481,166.

(51) Int. Cl.⁷ ................................................ E04H 9/00
(52) U.S. Cl. ........................ 52/167.1; 52/79.4; 52/274; 52/293.3; 52/745.08
(58) Field of Search ................................ 52/79.4, 79.11, 52/79.12, 81.1, 86, 88, 167.1, 169.6, 274, 293.3, 295, 745.07, 745.08, 742.14

(56) References Cited

U.S. PATENT DOCUMENTS

| | | | | |
|---|---|---|---|---|
| 970,873 A | * | 9/1910 | Bear | 52/23 X |
| 1,137,689 A | * | 4/1915 | Allsteadt | 52/82 |
| 1,193,767 A | * | 8/1916 | Crisell | 52/82 |
| 2,278,956 A | * | 4/1942 | Wagner | 52/81.4 |
| 2,413,243 A | * | 12/1946 | Neff | 52/81.4 |
| 2,724,871 A | * | 11/1955 | Levine | 52/247 |
| 3,065,574 A | * | 11/1962 | Piana | 52/309.1 |
| 3,186,523 A | * | 6/1965 | Brisse | 52/149 |
| RE26,121 E | | 12/1966 | Wiegard | |
| D211,783 S | * | 7/1968 | Turner | 52/81.1 X |
| 3,562,975 A | | 2/1971 | Moss | |
| 3,648,420 A | * | 3/1972 | Nelson | 52/86 |
| 3,660,951 A | * | 5/1972 | Cadwell | 52/2.18 |
| 3,924,367 A | * | 12/1975 | Stewart | 52/81.4 |
| 4,126,972 A | * | 11/1978 | Silen | 52/34 |
| 4,160,340 A | * | 7/1979 | Levett | 47/27 |
| 4,324,074 A | * | 4/1982 | South et al. | 52/2.15 |
| 4,550,544 A | * | 11/1985 | Thoeny | 52/309.8 X |
| 4,569,166 A | * | 2/1986 | Buchmuller | 52/86 |
| 4,625,468 A | | 12/1986 | Hampel | |
| 4,848,046 A | * | 7/1989 | Wallhead | 52/81.4 |
| 5,671,568 A | | 9/1997 | Armanno, Sr. | |
| 5,921,043 A | * | 7/1999 | McDonald | 52/309.9 |
| 6,131,343 A | | 10/2000 | Jackson, Jr. | |
| 6,151,841 A | * | 11/2000 | Green | 52/79.4 |
| 6,343,553 B1 | * | 2/2002 | Tylicki, Jr. | 52/79.1 |
| 6,393,776 B1 | * | 5/2002 | Waller et al. | 52/169.6 |

FOREIGN PATENT DOCUMENTS

| | | | | |
|---|---|---|---|---|
| CA | 774802 A | * | 1/1968 | 52/81.1 |
| GB | 494382 | * | 10/1938 | 52/169.6 |
| GB | 1329403 A | * | 9/1973 | 52/81.1 |

\* cited by examiner

*Primary Examiner*—Carl D. Friedman
*Assistant Examiner*—Brian E. Glessner
(74) *Attorney, Agent, or Firm*—Technoprop Colton LLC

(57) ABSTRACT

A method and apparatus for a weather shelter having a base, the base having a peripheral edge and being secured to the ground, a dome with a circumferential edge, wherein the dome fits completely over the base, the circumferential edge of the dome is located proximally to the peripheral edge of the base, and a doorway.

19 Claims, 7 Drawing Sheets

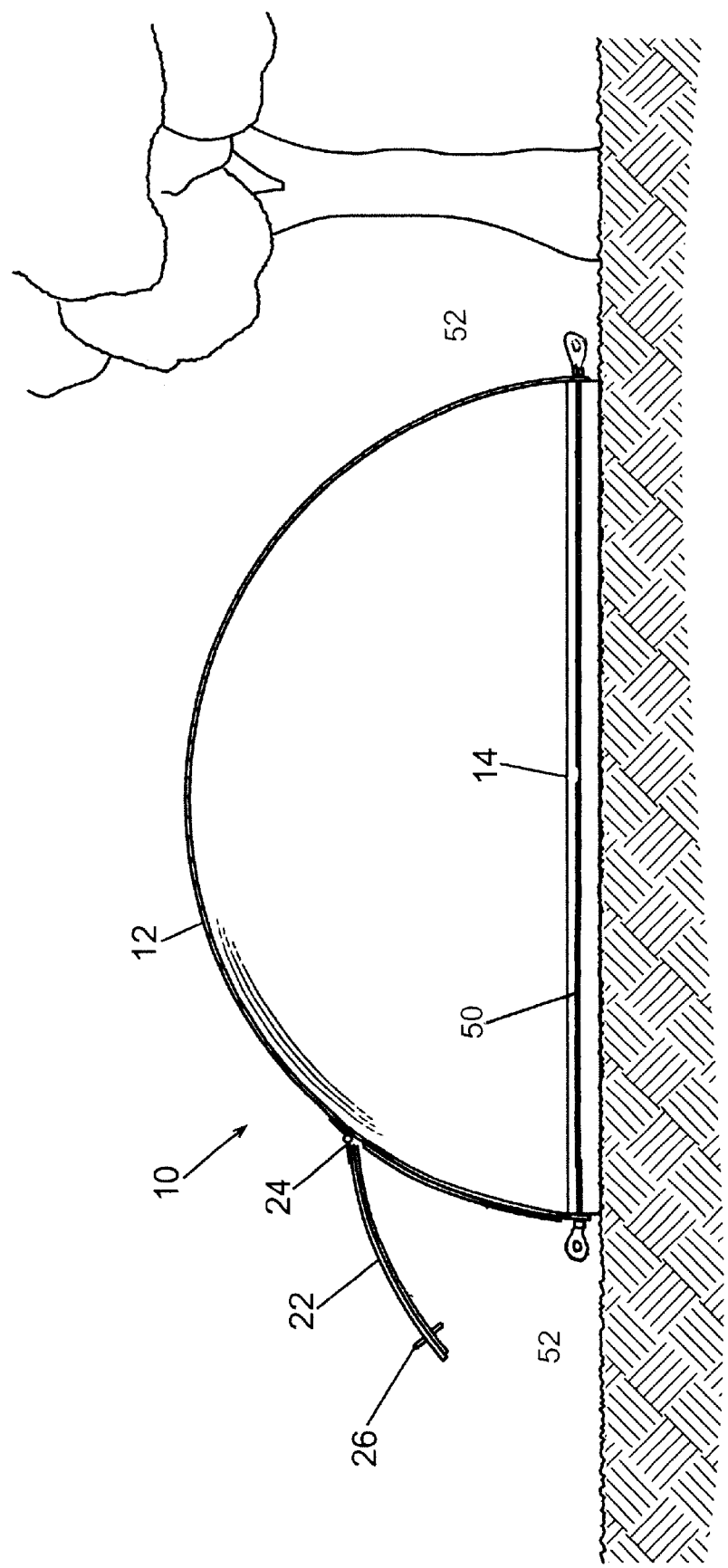

WEATHER SHELTER

STATEMENT OF RELATED APPLICATIONS

This application is a continuation of U.S. patent application Ser. No. 09/834,018, filed on Apr. 12, 2001, now U.S. Pat. No. 6,481,166.

BACKGROUND OF THE INVENTION

1. Technical Field

The present invention relates generally to the field of shelters, and more specifically to a method and apparatus for an outdoor, above ground, relatively inexpensive to construct shelter for protection from severe weather.

2. Prior Art

Unsafe weather or natural climatic forces can strike without adequate warning causing property damage and placing human life in grave danger. These natural climatic forces often demolish homes and buildings. When humans remain indoors during such natural catastrophic events, they are in further danger from falling debris and from the possible collapse of the surrounding structures. For this reason, it is often advisable that persons evacuate their home or building or that persons remain in secured locations, such as basements. However, many homes lack basements, and people are often without safe shelter during these events.

Protective shelters have been recognized and utilized to protect humans from catastrophic weather, such as thunderstorms, hurricanes, and tornadoes. Not unexpectedly, such shelters have evolved and the prior art discloses an array of such shelters.

U.S. Pat. No. RE 26,121 to Jackson discloses a type of building construction that incorporates a means for resisting sudden shocks and for minimizing injury to occupants should the building collapse. The building has outwardly tilted walls, so that if the building collapses, the walls will fall outwardly away from the occupants. This building is a tethered permanent structure and only tangentially is a weather shelter.

U.S. Pat. No. 356,975 to Moss discloses a prefabricated shelter that has wall panels bowed and secured together in a dome-like structure. The multiple wall panels provide flexible joints, and allow ease of construction. Moss '975 is not a unitary structure and does not have a weighted slab base for optimal stability of the weather shelter.

U.S. Pat. No. 4,625,468 to Hampel discloses a double-wall tent structure quickly erectable over a central bench or hole. The tent structure includes tightly woven, rip-resistant fabric panels supported by tensile rods or wands, a tub floor extending into and lining a central trench or hole, and an exterior, light-reflecting, metalized, semi-transparent disposable membrane. The bottom circumferential edge of the outer membrane extends into a shallow trench or ditch, excavated around the perimeter of the inner tent structure. This is a lightweight tent structure likely incapable of withstanding a tornado or hurricane and thus not likely to protect humans from catastrophic weather.

U.S. Pat. No. 5,671,568 to Armanno discloses a hurricane shelter generally comprising a dome shaped cover, a cylindrically shaped base wall, and a central column. In its lower position, the dome rests on the base wall and provides shelter in an internal safe space for use in times of emergency, while the central column enables the dome to be raised and locked in its upper position well above the base wall to provide access to the safe space. The base wall forms a circle in plan view, matching in size the diameter of the lower portion of the dome that rests on this wall. The circular base and the dome shaped cover provide low resistance to the winds and to provide the strength to resist the force of hurricane winds, the base wall is connected to a foundation that is typically located on or below ground level. The foundation usually is constructed of heavy material such as concrete, and if desired, even greater strength and weight can be added by including a footing for the foundation. This structure is somewhat complex and is not likely to be manufactured in an inexpensive fashion. Moreover, the structure lacks an entrance doorway and thereby forces the user to raise the dome-like structure prior to entrance. The base is stabilized by adding additional weight on the base, which can further increase cost.

U.S. Pat. No. 6,131,343 to Jackson discloses an apparatus and method for a storm shelter that can be used aboveground and belowground, and may be skin supported. Jackson '343 discloses that its top, front, and rear surfaces can be made from a single, curved piece of material, and, that its sides are made from two straight pieces of material, all of which pieces are mounted onto parallel curved fine members which are mounted onto a base frame that is anchored to a foundation. This shelter preferably is a corrugated metal skin attached to a foundation. Importantly, this structure is not dome-like to withstand strong winds and does not disclose a stabilized, secured base.

While the prior proceeds to disclose an array of weather shelters, what is needed but not found in the prior art is a weather shelter that can withstand catastrophic weather and can be manufactured in a flexible, inexpensive manner.

BRIEF SUMMARY OF THE INVENTION

The present invention relates generally to the field of shelters, and more specifically to a method and apparatus for an outdoor, aboveground shelter for protection from destructive weather that is relatively inexpensive to construct at a central manufacturing facility and to transport to a site or, alternatively, to construct on site. The weather shelter in one embodiment comprises a dome, a base, cables, and spikes, wherein the dome is secured over the base by passing cables imbedded into the base through eyelets around the lower periphery of the dome and securing the cables to the earth via spikes.

The dome is a relatively lightweight and strong partial sphere having a hinged door allowing passage therethrough. For example, the dome can be manufactured from Kevlar® or other high-strength materials. The base is a relatively heavyweight and strong disc. For example, the base can be manufactured from concrete or other heavyweight materials. The tie-cables preferably are embedded in the base and are relatively high strength structures. For example, the tie-cables can be manufactured from steel cables or other high tensile strength materials. The tie-down rods are relative high strength stakes. For example, the tie-down rods can be metal stakes such as those used to stabilize utility poles or other high-strength materials.

The base including the embedded tie-cables either can be prefabricated at a central manufacturing facility and transported to the final site on a flatbed truck, or can be manufactured at the final site. For example, for a concrete slab base, the base can be poured and set, and the tie-cables embedded in the unhardened concrete, at a central manufacturing facility. Alternatively, if the base is poured on site, concrete for the base is poured or placed on a generally level surface (it may be necessary to level the surface prior to installation), tie-cables are embedded in the unhardened concrete, and the base structure with the embedded tie-cables is allowed to harden.

The dome comprises eyelets or attachment holes spaced along or proximal to the lower peripheral edge of the dome. The dome is placed over the base and the ends of the tie-cables extending out of the base are passed through the eyelets. Preferably, the tie-cables comprise a loop or some other attachment means through which the tie-down rods can pass and anchor the tie-cables to the ground. The tie-cables typically are of sufficient length that they will extend (that is, can be placed, inserted or hammered) into the ground a sufficient distance to safely and securely anchor the base to the ground. By passing through the eyelets in the dome, the tie-cables in conjunction with the tie-down rods anchor the dome to the base and/or the ground.

One enters and exits the shelter through a doorway, closed by a door. The door has hinges to attach the door to the shelter, creating a doorway. The door is reversibly closable to the dome by a sealant material such as, for example, a Velcro® hook and loop type of fastener, a zipper or zippers, snaps, hooks and eyes, or the like. A handle allows the user to open and close the door. The use of a Velcro® hook and loop type of fastener allows air to enter and exit the shelter for breathing, and also allows the pressure inside of the shelter to equalize to the pressure outside of shelter.

These features and advantages of the present invention and the complementary method for installing the invention will become more apparent to those of ordinary skill in the art when the following detailed description of the preferred embodiments is read in conjunction with the appended figures, in which like reference numerals represent like components throughout the various figures.

BRIEF DESCRIPTION OF THE FIGURES

FIG. 6 is a side cross-sectional view of the weather shelter shown in FIG. 1 showing the entry/exit door in operation.

DETAILED DESCRIPTION OF THE INVENTION

The present invention relates generally to the field of shelters, and more specifically to an apparatus for an outdoor, aboveground shelter for protection from destructive weather that is relatively inexpensive to construct and transport, and a method for installing the apparatus at a selected location. The present apparatus provides an improved weather shelter and the method provides an easy and inexpensive way of constructing the weather shelter.

Figure 1:
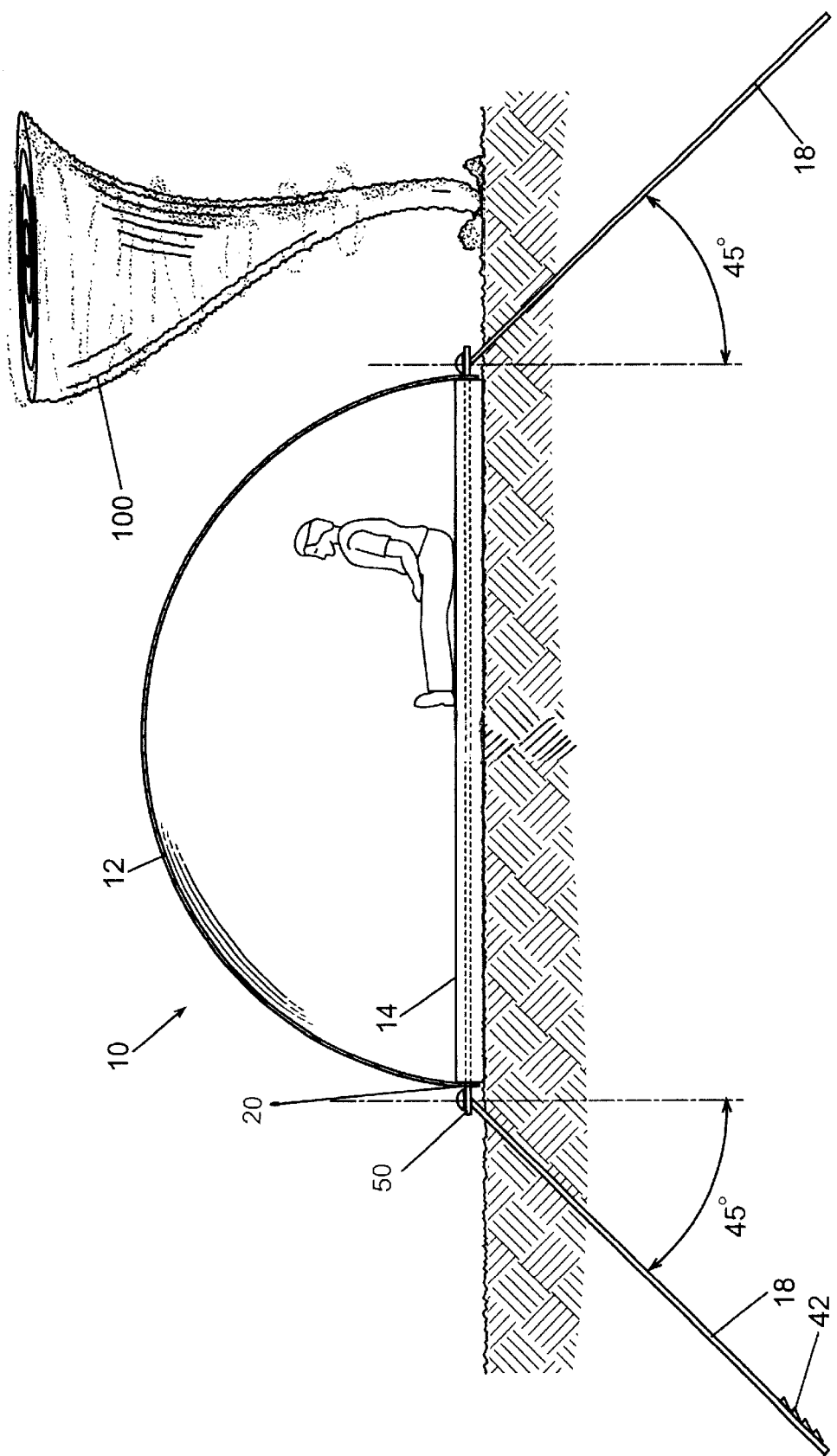
FIG. 1 is a side cross-sectional view of the weather shelter of the present invention.

Referring to FIG. 1, a first embodiment of the weather shelter 10 comprises dome 12, base 14, tie-cables 50 located integrally within base 14, and tie-rods 18.

Dome 12 preferably is a half-sphere or somewhat less than a half-sphere, unitary structure made of fiberglass, metal, plastic, Kevlar®, carbon fiber or other relatively lightweight, relatively strong material. Dome 12 generally is a half-sphere structure without corners. As is generally known, spherical, circular, smooth, round or otherwise cornerless or featureless structures are less likely to be damaged or affected by winds, such as tornados or hurricanes. Dome 12 has door 22 with hinges 24 and handle 26 for entry and exit, as shown in FIG. 4.

Base 14 can be made from materials such as concrete, reinforced concrete, stone, aggregates, asphalt or any relatively heavyweight, relatively strong, stable material. For example, in one embodiment, base 14 can be a 4" to 8" thick circular slab of concrete having a predetermined diameter depending on the desired final shelter size and use and an outer peripheral edge or side. Base 14 can have a slightly smaller diameter than dome 12 so that dome 12 extends over and around base 14 and the interior surface of the lower peripheral edge of dome 12 can be in contact with or be proximal to the outer circumferential edge (periphery) 5 of base 14. Base 14 either can be constructed on site, or can be prefabricated and delivered to the site. In this embodiment, dome 12 can be secured over base 14 by means of placing cables 50 through eyelets or holes 20.

Figure 2:
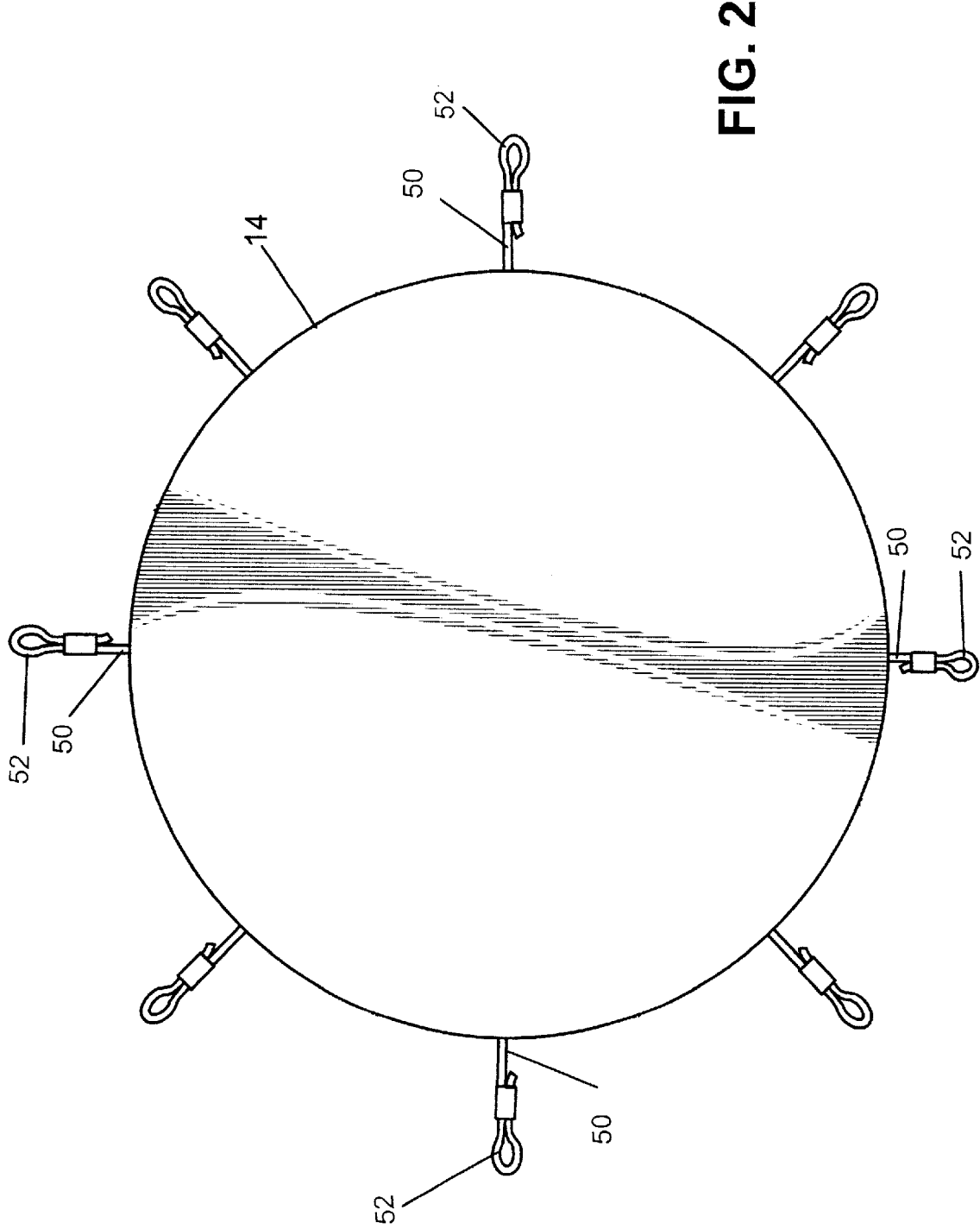
FIG. 2 is a top view of the base of the weather shelter shown in FIG. 1.

Referring to FIG. 2, a top view of base 14 is shown in whole. Base 14 is a generally circular structure without corners. As is generally known, circular, smooth, round or otherwise cornerless or featureless structures are less likely to be damaged or affected by winds, such as tornados or hurricanes. Tie-cables 50 extend generally horizontally out of base 14. In this exemplary embodiment, tie-cables 50 have loops or eyeholes 52 on their ends. The ends of tie-cables 50 comprising loops or eyeholes 52 pass through and cooperate with eyelets or holes 20 to secure dome 12 over base 14 and to the ground. Thus, tie-cables 50 are somewhat longer than the diameter of base 14, such that loops or eyeholes 52 extend beyond the periphery of base 14 and can pass through eyelets or holes 20 and be anchored into the ground without being interfered with by base 14.

Figure 4:
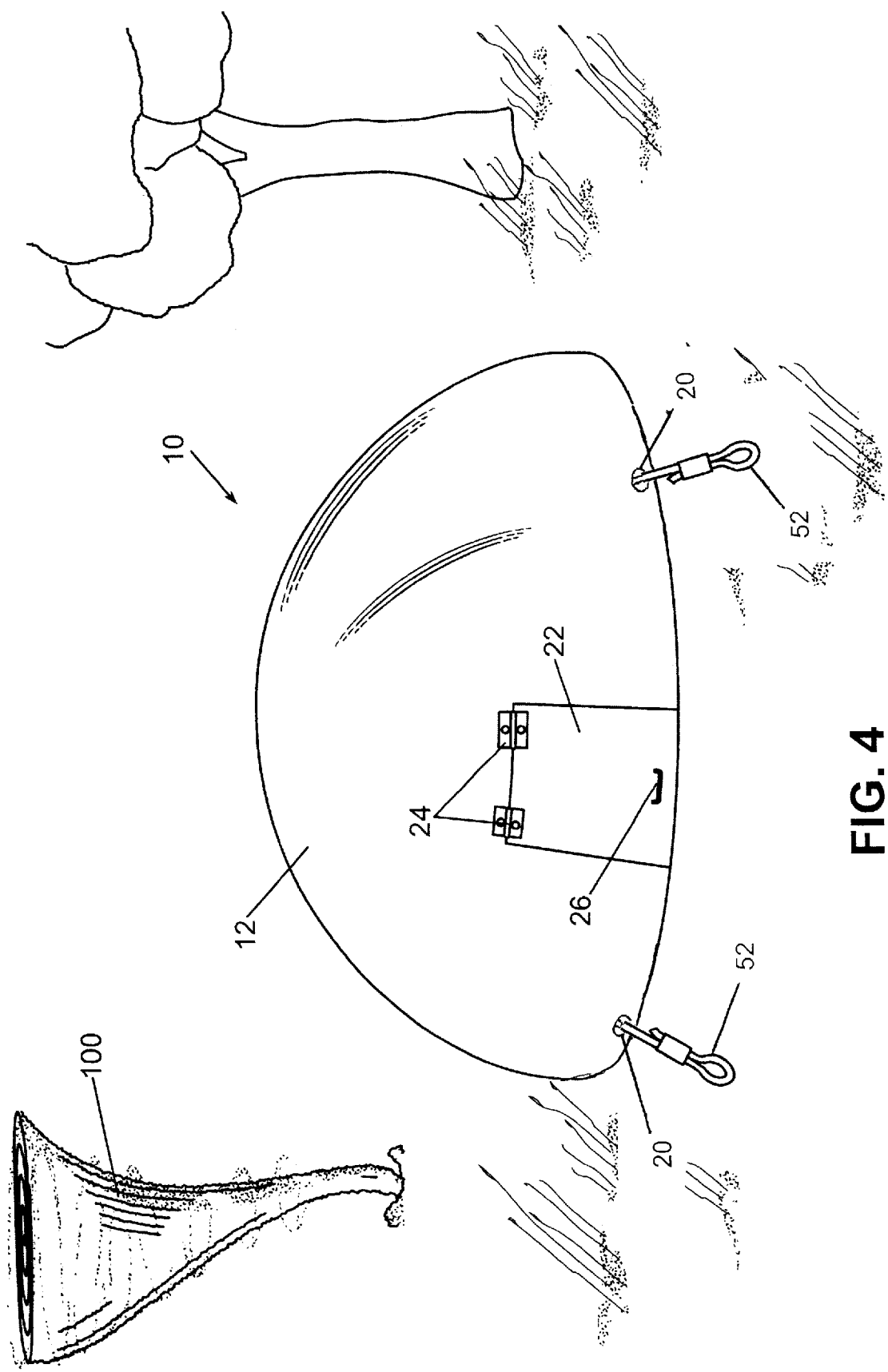
FIG. 4 is a top view of the weather shelter shown in FIG. 1

More specifically, referring to FIGS. 1 and 4, tie-cables 50 are inserted through eyelets or holes 20 and are secured to the ground by inserting tie-rods 18 into loop or eyehole 52 of each tie-cable 50. As the respective tie-cables 50 are fed through eyelets or holes 20 and as loops or eyeholes 52 are secured via tie-rods 18 to the ground, dome 12 becomes more secure over base 14. Although there are preferably 2 to 16 tie-cables 50 used to secure dome 12 over base 14 and the shelter 10 to the ground, the number of tie-cables 50 used depends in part on the strength of tie-cables 50, the strength of the material of which dome 12 is made, and the strength of the desired connection between the shelter 10 and the ground.

Figure 3:
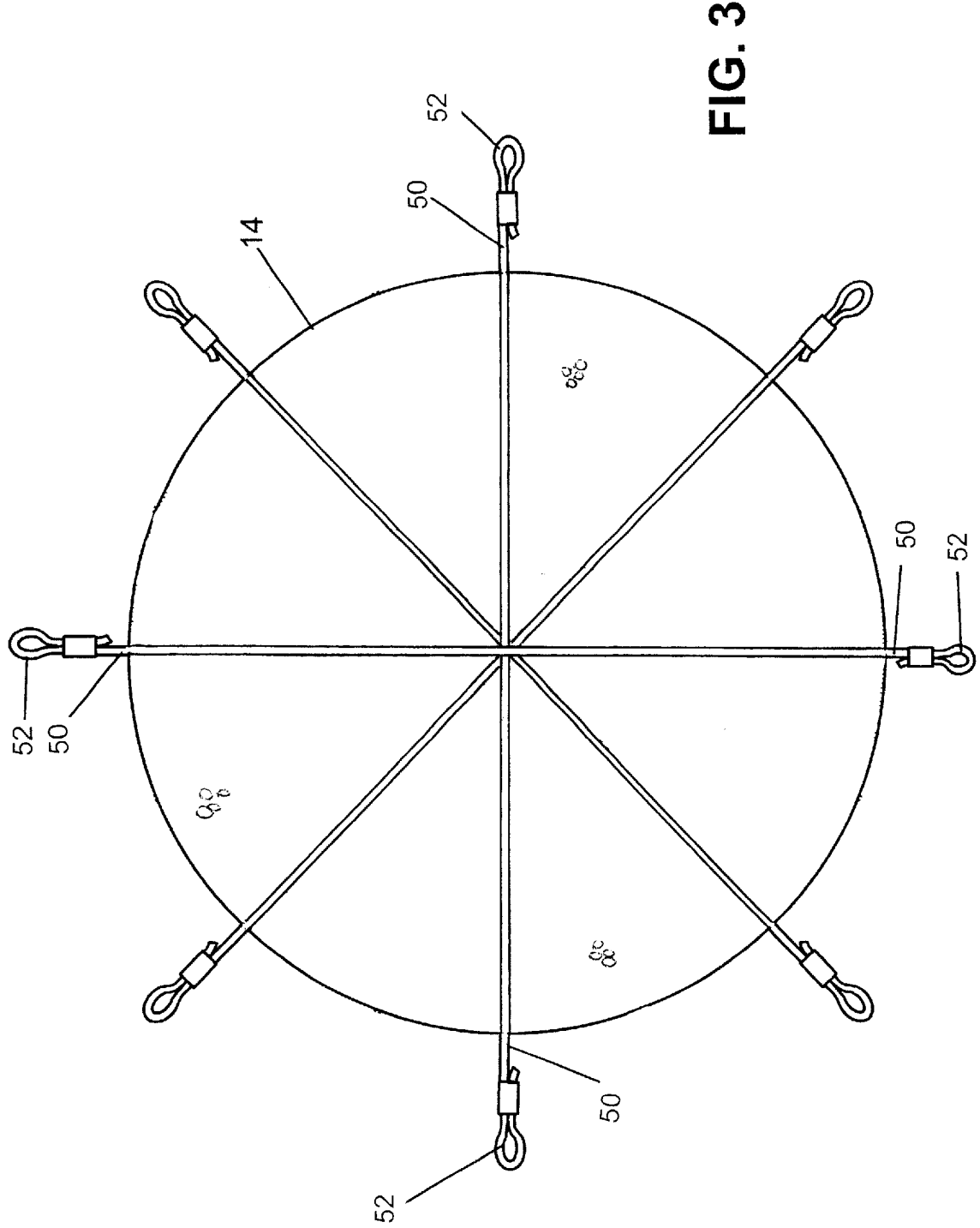
FIG. 3 is a top sectional view of the base shown in FIG. 2.

Referring to FIG. 3, a top sectional view of base 14 is shown. Tie-cables 50 are shown. Tie-cables 50 preferably are embedded within base 14, preferably approximately halfway through the vertical thickness of base 14, as shown in FIGS. 1 and 6. Tie-cables 50 also preferably are embedded diametrically within base 14. If one tie-cable 50 is used, it preferably is a single diameter of base 14. If two tie-cables 50 are used, they preferably are perpendicular diameters of base 14, crossing each other proximal to the center of base 14. If more than two tie-cables 50 are used, they preferably are evenly spaced diameters of base 14. As shown in the example of FIG. 3, four tie-cables 50 evenly spaced within base 14 are used. Tie-cables 50 preferably are steel cables, but can be any high-strength, that is, high tensile strength, materials, such as, for example, steel, aluminum, titanium, carbon fiber reinforced polymers, other metals and polymers or the like, and other relatively high strength relatively flexible materials such as, for example, metal or high tensile strength cable. Tie-cables 50 are of a strength designed to hold shelter 10 safely to the ground during even the fiercest storm. The number of tie-cables 50 used depends on the strength of the tie-cables 50 themselves and the strength of the desired connection between the shelter 10 and the ground.

Referring to FIG. 4, dome 12 in one embodiment is a half-sphere or somewhat less than a half-sphere, unitary structure. Dome 12 has door 22 with hinges 24 and handle 26 for entry and exit. FIG. 4 illustrates one exemplary method of securing shelter 10 to the ground.

Figure 5:
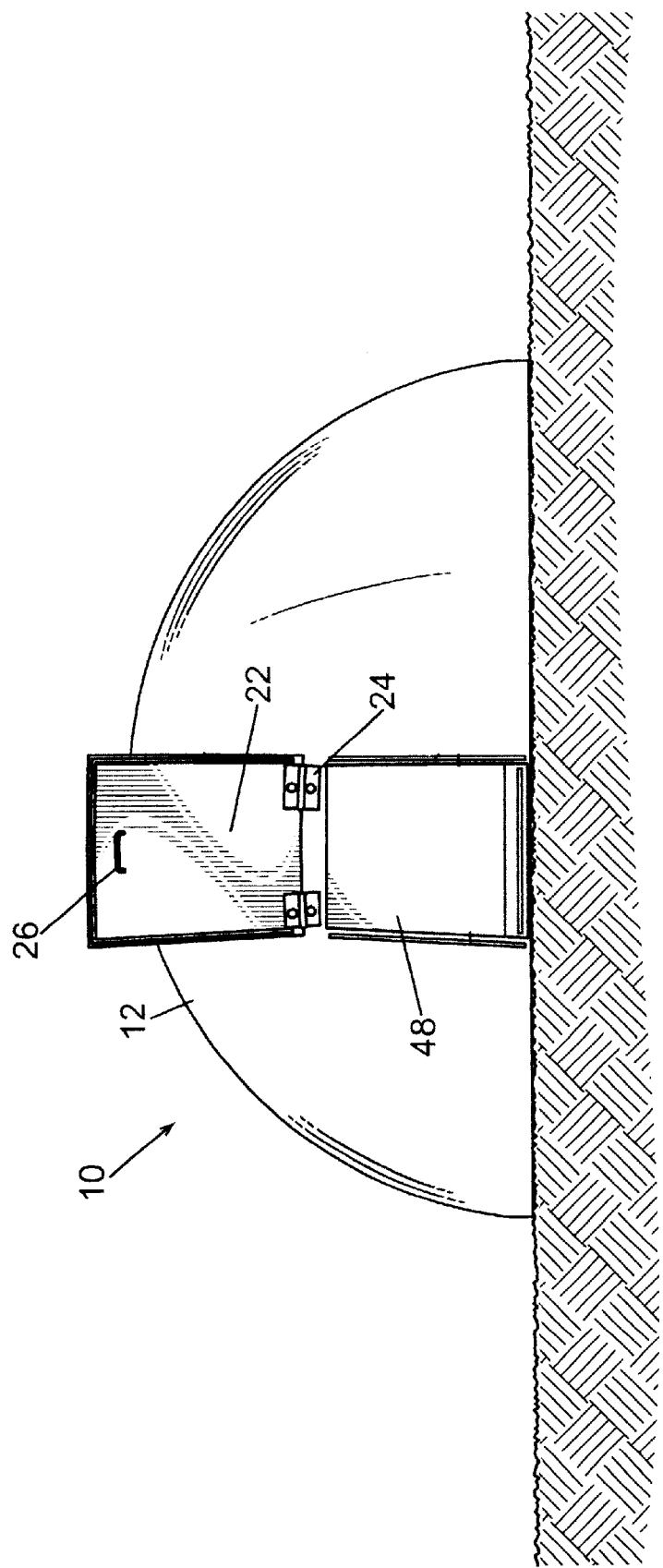
FIG. 5 is a front perspective view of the entry/exit door of the present invention.
Figure 7A:
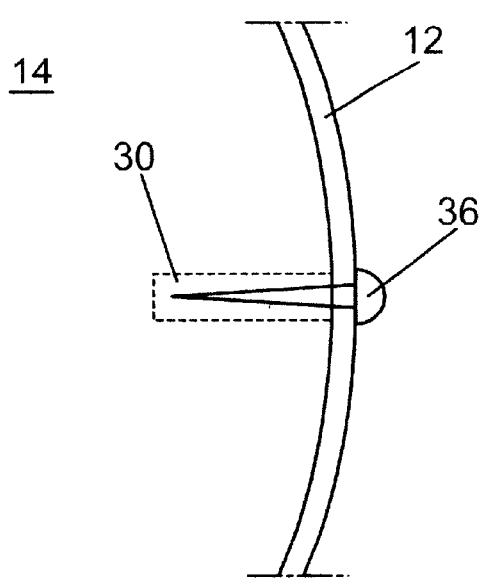
FIG. 7A illustrates a cross-sectional view of a first additional means for attaching the dome to the base of the weather shelter shown in FIG. 1.
Figure 7B:
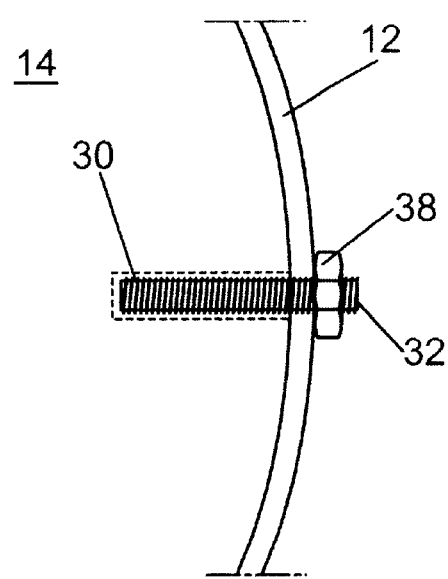
FIG. 7B illustrates a cross-sectional view of a second additional means for attaching the dome to the base of the weather shelter shown in FIG. 1.
Figure 7C:
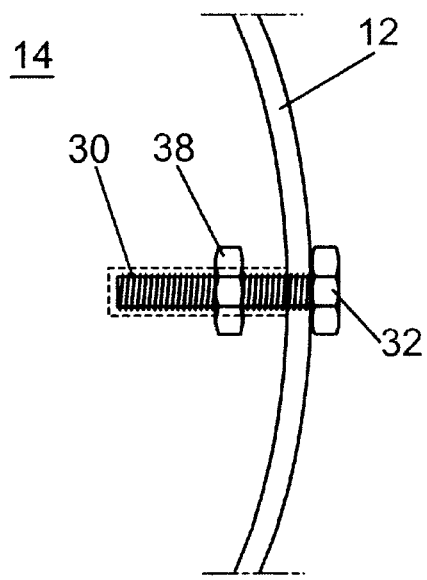
FIG. 7C illustrates a cross-sectional view of a third additional means for attaching the dome to the base of the weather shelter shown in FIG. 1.
Figure 7D:
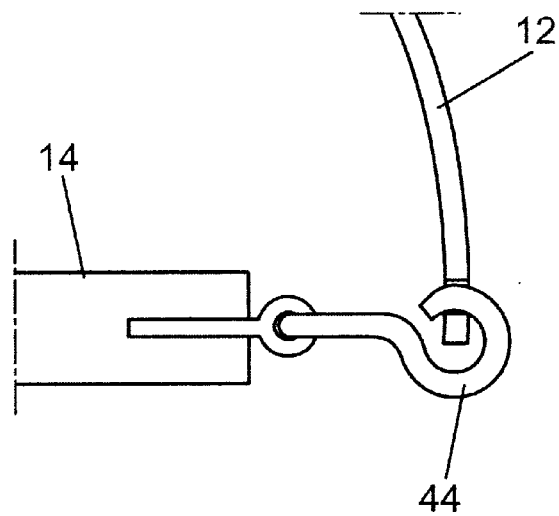
FIG. 7D illustrates a cross-sectional view of a fourth additional means for attaching the dome to the base of the weather shelter shown in FIG. 1.

Referring to FIG. 5, which is a front elevational view of shelter 10 with door 22 open, and FIG. 6, which is a side cross-sectional view of shelter 10 as shown in FIG. 5, in one embodiment, door 22 has hinges 24 on the top edge of door 22 and reversibly closes doorway 48 by securing door 22 to the remainder of dome 12 by a sealant material such as, for example, a Velcro® hook and loop type of fastener, a zipper or zippers, snaps, hooks and eyes, or the like. Handle 26 allows the user to open and close doorway 48. It is understood that a single or a plurality of hinges can function as hinges 24 and that a simple opening can function as doorway 48.

As disclosed above, the periphery of door 22 and doorway 48, which can include the part of base 14 immediately below door 22, preferably can be partially or completely surrounded with a reclosable sealant material fastener such as a Velcro® hook and loop type of fastener. The use of a Velcro® hook and loop type of fastener allows air to enter and exit shelter 10 for breathing, and also allows the pressure inside of shelter 10 to equalize to the pressure outside of shelter 10. This is very important when a tornado 100 passes by shelter 10, as the ambient pressure created by a tornado 100 may be, and generally is, less than the pressure within a structure, such as shelter 10. Further, the use of a Velcro® hook and loop type of fastener allows door 22 to pop open and close in doorway 48 easily if the pressure outside of shelter 10 suddenly drops.

Referring to FIG. 4, which is a perspective view of one embodiment of shelter 10, dome 12 surrounds and fits completely over the top surface of base 14, and shelter 10 is secured to the ground. Tie-cables 50 extend beyond the outer edge of base 14 far enough so that tie-rods 18 can be inserted through loops or eyeholes 52 and then inserted into the ground. Door 22 and hinges 24 provide for entry and exit into and out of shelter 10.

Referring back to FIG. 1, the securing of shelter 10 to the ground is shown in more detail. In the embodiment shown in FIG. 1, tie-rods 18 can have barbs 42 such as those used in supporting utility poles. In effect, tie-rods 18 are very large stakes approximately 1" in diameter and 10' long and individual tie-rods 18 are placed through each loop or eyehole 52. Tie-rods 18 are inserted into the ground generally at approximately a 45° angle, and even more generally at an angle between approximately 30° to 60°, but can be inserted at an angle of the user's discretion. Barbs 42 assist in holding shelter 10 securely to the ground.

Although the penetration angle of tie-rods 18 into the ground can vary from 0° to 180°, an approximately 45° angle is preferred for at least two reasons. First, having several tie-rods 18 anchored into the ground at 45° angles can help prevent shelter 10 from "floating," which may happen if tie-rods 18 are pounded into the ground at 90° angles. Second, a 45° angle allows any water traveling down through the ground to only contact tie-rods 18 for a short time (the water wants to travel at a 90°, that is, straight downward), thus lessening the chance of corrosion of tie-rods 18.

The peripheral edge of dome 12, which is the inner side surface proximal to the lower edge of dome 12, need not be attached directly to base 14. As the insertion of tie-cables 50 through eyelets or holes 20 and the insertion of tie-rods 18 into loops or eyeholes 52 can be sufficient to secure dome 14 over base 12, the physical attachment of dome 14 to base 12 can be unnecessary. However, it is understood that an additional attachment means, which attaches the peripheral edge of dome 14 to base 12, can add further stability to shelter 10.

Referring to FIG. 7, various example embodiments of such additional attachment means to hold dome 12 to base 14 are shown. As shown in FIG. 7A, additional attachment means can be spikes 36 that fit within peripheral holes 30 on base 14. As shown in FIG. 7B, additional attachment means can be bolts 32 contained in peripheral holes 30 on base and nuts 38 that can be screwed onto bolts 32. For example, when the concrete for base 14 is formed, peripheral holes 30 can be formed in the circumferential edge of base 14 while the concrete is still wet to later receive bolts 32 or spikes 36. As shown in FIG. 7C, in an alternative embodiment, when the concrete for base 12 is poured, bolts 32 and nuts 38 can be placed in the wet concrete with one nut within the concrete to further secure bolt 32 in the concrete and the threaded end of bolt 32 extending outward from the concrete, so that dome 12 is secured via a second nut 38. As shown in FIG. 7D, hooks 44 can be placed within peripheral holes 30, or placed within the wet concrete, and hooked onto dome 12. In each embodiment, spike 36, bolt 32, or hook 44, is inserted through additional attachment holes 20 of dome 12 to secure dome 12 to base 14.

It is contemplated that shelter 10 can have no openings except for door 22 and doorway 48, thus preventing excess wind or rain from entering shelter 10. Although this may make the interior of shelter 10 hot and stuffy, such discomfort should be tolerable for the short duration for the user is likely to be in shelter 10 during a tornado or other extreme weather situation.

A method for constructing a shelter 10 also is contemplated by the invention. For illustrative purposes, base 14 is prefabricated off-site and delivered to the site along with dome 12 and tie-rods 18. Specifically, base 14 is poured or otherwise constructed off-site with tie-cables 50 embedded therein. Base 14 with embedded tie-cables 50 is delivered to the site and placed in the selected position on the ground. Dome 14 is placed over base 14 and loops or eyeholes are passed through eyelets or holes 20. Tie-rods 18 are passed through loops or eyeholes 52 and inserted into the ground. Thus, shelter 10 is constructed and secured to the ground in a simple manner.

The above detailed description of the preferred embodiments, the appendix and the appended figures are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention.

What is claimed is:

1. A weather shelter comprising:
   a. a base having a thickness, a width, and an outer peripheral side;
   b. a tie-cable embedded widthwise within said base, said tie-cable having an end extending beyond said outer peripheral side of said base;
   c. a tie-rod cooperating with said tie-cable;
   d. a dome having an inner peripheral edge and an eyelet in said inner peripheral edge, wherein said dome fits over said base, and said inner peripheral edge of said dome is proximal to said outer peripheral side; and
   e. a doorway located through said dome, wherein said doorway allows for entrance into and exit from said weather shelter,
   wherein said end of said tie-cable extends through said eyelet and said tie-cable is secured to the ground with said tie-rod thereby securing said base and said dome to the ground.

2. The weather shelter characterized in claim 1, wherein said dome has two eyelets; said tie-cable has two ends, one of which extends through one of said eyelets and the other of which extends through the other of said eyelets; and two tie-rods are used to secure the weather shelter to the ground, with one of said two tie-rods cooperating with each of said two ends of said tie-cable.

3. The weather shelter characterized in claim 1, further comprising a plurality of tie-cables each having at least one end, and a plurality of tie-rods; wherein said dome has a plurality of eyelets, said end of each of said plurality of tie-cables extends through one of said plurality of eyelets, and one of said plurality of tie-rods is used to secure each said end to the ground.

4. The weather shelter characterized in claim 1, wherein said at least one tie-down rod is inserted into a surface at an angle between 30 to 60 degrees from horizontal.

5. The weather shelter characterized in claim 1, wherein said dome is releasably attached to said base.

6. The weather shelter characterized in claim 1, wherein said dome is constructed from a single unitary material selected from the group consisting of carbon fiber materials, metals, plastics, fiber-reinforced polymers, fiberglass, and poly-para-phenylene terephthalamide.

7. The weather shelter characterized in claim 1, wherein said base is constructed from a material selected from the group consisting of concrete, reinforced concrete, stone, asphalt, and combinations thereof.

8. The weather shelter characterized in claim 1, wherein said tie-cable is constructed from a material selected from the group consisting of metal cables, metal alloy cables, and carbon fiber reinforced polymers.

9. The weather shelter characterized in claim 1, wherein said base is between 3 and 8 inches thick.

10. The weather shelter characterized in claim 1, wherein said doorway in said dome is closed by means of a reclosable door.

11. The weather shelter characterized in claim 10, wherein said reclosable door is secured to said weather shelter by hinges.

12. The weather shelter characterized in claim 11, wherein said reclosable door is secured to said weather shelter by a fastener that is not airtight.

13. A weather shelter comprising:
   a. a circular base having a thickness, a width, and an outer peripheral side, said base being constructed from a material selected from the group consisting of concrete, reinforced concrete, stone, asphalt, and combinations thereof;
   b. at least one tie-cable embedded diametrically within said base, said at least one tie-cable having at least one end extending beyond said outer peripheral side of said base, and said at least one tie-cable being constructed from a material selected from the group consisting of metal cables, metal alloy cables, and carbon fiber reinforced polymers;
   c. at least one tie-rod cooperating with said at least one tie-cable;
   d. a dome having an inner peripheral edge and at least one eyelet in said inner peripheral edge, said dome being constructed from a material selected from the group consisting of carbon fiber materials, metals, plastics, fiber reinforced polymers, fiberglass, and poly-para-phenylene terephthalamide, wherein said dome fits over said base, and said inner peripheral edge of said dome is proximal to said outer peripheral side; and
   e. a doorway located through said dome, wherein said doorway allows for entrance into and exit from said weather shelter,
   wherein said at least one end of said at least one tie-cable extends through said at least one eyelet, respectively, and said at least one tie-cable is secured to the ground with said at least one tie-rod, respectively, thereby securing said base and said dome to the ground.

14. A method of constructing the weather shelter claimed in claim 1 comprising the steps of:
   a. constructing said base having at least one of said tie-cables embedded therein;
   b. placing said dome over said base such that said end of said tie-cable extends through said eyelet; and
   c. securing said base and said dome to the ground by securing said end of said tie-cable to the ground with said tie-rod.

15. The method of claim 14, wherein said base is constructed off-site and delivered to a site.

16. The method of claim 14, wherein said constructing of said base is by pouring solidifying and hardening material into a defined area.

17. The method of claim 16, wherein said solidifying material is selected from the group consisting of concrete, reinforced concrete, stone, and asphalt.

18. The method in claim 16, wherein said tie-cable is embedded in said base prior to the solidification of said solidifying material and said tie-cable is fixed within said base upon the solidifying of said solidifying material.

19. The method of claim 14, wherein said tie-rod is inserted into the ground at an angle between 0 and 180 degrees from horizontal.

* * * * *